(12) United States Patent
Ashe et al.

(10) Patent No.: US 6,593,947 B1
(45) Date of Patent: *Jul. 15, 2003

(54) METHOD AND SYSTEM FOR IMAGE RENDERING INCLUDING POLYMORPHIC IMAGE DATA IN A GRAPHICAL USER INTERFACE

(75) Inventors: Dylan B. Ashe, Sunnyvale, CA (US); Lewis Karl Cirne, Santa Cruz, CA (US); Jeffrey Robert Cobb, Sunnyvale, CA (US); Ramesh Gupta, San Jose, CA (US); Eric Charles Schlegel, Redmond, WA (US)

(73) Assignee: Apple Computer, Inc., Cupertino, CA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/646,528

(22) Filed: May 10, 1996

(51) Int. Cl.[7] .............................................. G06F 17/21
(52) U.S. Cl. ...................................... 345/810; 715/530
(58) Field of Search ................................. 345/433, 441, 345/133, 335, 339, 348, 350, 333, 334, 349, 356, 810, 764; 395/682, 683, 684; 715/530

(56) References Cited

U.S. PATENT DOCUMENTS

| | | | | |
|---|---|---|---|---|
| 5,301,301 A | * | 4/1994 | Kodosky et al. | 345/349 |
| 5,345,550 A | * | 9/1994 | Bloomfield | 345/353 |
| 5,394,523 A | * | 2/1995 | Harris | 345/501 |
| 5,455,599 A | * | 10/1995 | Cabral et al. | 345/133 |
| 5,495,561 A | * | 2/1996 | Holt | 395/114 |
| 5,566,278 A | * | 10/1996 | Patel et al. | 395/114 |
| 5,668,997 A | * | 9/1997 | Lynch-Freshner | 395/683 |

* cited by examiner

Primary Examiner—Stephen S. Hong
(74) Attorney, Agent, or Firm—Sawyer Law Group LLP

(57) ABSTRACT

A system for providing polymorphic image data for images in a graphical user interface on a computer system includes an operating system, and an imaging object structure, the imaging object structure included in the operating system and utilized to generate images in the graphical user interface. Additionally, the imaging object structure further comprises a subclass of imaging objects, the subclasses includes singular imaging objects and composite imaging objects. The singular imaging objects further include, but are not limited to, text imaging objects, picture imaging objects, pattern imaging objects, and icon imaging objects. Additionally, the composite imaging objects generate composite images of a desired combination of singular images generated by the singular imaging objects. Further, the imaging object structure includes a SOM object structure.

20 Claims, 3 Drawing Sheets

METHOD AND SYSTEM FOR IMAGE RENDERING INCLUDING POLYMORPHIC IMAGE DATA IN A GRAPHICAL USER INTERFACE

FIELD OF THE INVENTION

The present invention relates to the rendering of polymorphic image data in graphical user interface elements and more particularly, to the atomic manipulation and rendering of a collection of a desired number of polymorphic images as a single composite image.

BACKGROUND OF THE INVENTION

In typical graphical user interfaces, several user interface elements exist to assist users in utilizing system operations. Included in these elements are menus, buttons, and lists. Most modern computer operating systems provide a set of system services that software developers can call to create such user interface elements. The MacOS Toolbox is the part of the MacOS operating system that provides these services for software intended to be deployed on Apple Macintosh systems, or compatibles.

The user interface elements typically display text strings, icons or other types of images to convey information to the user. Typically, the system services that implement these user interface elements allow only textual data by default. These services support other visual data formats only through extensibility hooks. To create these extensibility hooks and utilize the other visual data formats typically requires much effort on the part of software developers.

The original MacOS Toolbox provides this extensibility through the use of definition functions. For example, it implements standard definition functions for menus (MDEF=0), controls (CDEF=0), and lists (LDEF=0). These standard definition functions are capable of displaying only textual data. Software developers who wish to display other kinds of data in these elements, such as displaying a color palette in a menu, or an icon in a button must replace the standard definition function with their own implementations.

The programming interfaces for the definition functions for the various user interface elements are sufficiently different from each other that one custom definition function is normally incapable of being shared with different elements, such as drawing icons in both a button and a list. Software developers normally write a control definition function for the button, and a separate list definition function for the list, although a custom definition function was intended to be the same in each. The duplication of these definitions creates a larger code requirement for the system.

Accordingly, a need exists for a more direct and flexible system for associating customized types of visual data in user interface elements. The present invention addresses such a need.

SUMMARY OF THE INVENTION

The present invention provides system and method aspects for providing polymorphic image data for images in a graphical user interface on a computer system. In a system aspect, the system includes an operating system, and an imaging object structure, the imaging object structure included in the operating system and utilized to generate images in the graphical user interface. Additionally, the imaging object structure further comprises a subclass of imaging objects, the subclasses comprising singular imaging objects and composite imaging objects. The singular imaging objects further include, but are not limited to, text imaging objects, picture imaging objects, pattern imaging objects, and icon imaging objects. Additionally, the composite imaging objects generate composite images of a desired combination of singular images generated by the singular imaging objects. Further, the imaging object structure includes a SOM object structure.

In a method for providing polymorphic image data for image display on a graphical user interface, including user interface elements, in a computer system, the method includes retrieving image data, retrieving a desired imaging object, and creating an image reference with the image data for the desired imaging object. The method further includes associating the image reference with an element of the user interface, and displaying the desired image on the user interface. The creating of an image reference further includes creating an image reference of a singular type when the desired image is a singular image, and encapsulating the image data as the image reference for the desired image.

Alternatively, creating the image reference of a composite image when the desired image is a composite image further includes adding subimages for the desired image, setting a size of the desired image, creating new image references for each subimage of the desired image, encapsulating the image data for each subimage in the image reference, and specifying spatial characteristics of each of the subimages.

In a computer system aspect for providing polymorphic image data for elements in a graphical user interface, the computer system includes a display device for displaying the graphical user interface, an operating system, the operating system including an imaging object structure, and an application program, the application program for utilizing the imaging object structure to generate images in the graphical user interface.

With these and other aspects of the present invention, greater flexibility for development of unique items of text, icons, graphics, etc., in elements of a graphical user interface is achieved. Further, the use of an imaging object structure in accordance with the present invention provides greater opportunity for sharing developed items among the various elements in a less complicated manner and with reduced duplication of efforts. These and other advantage of the aspects of the present invention will be more fully understood in conjunction with the following detailed description and accompanying drawings.

DETAILED DESCRIPTION

The present invention relates to an easier and more flexible approach to specification and design of customized elements, including menus, buttons, and lists, in a graphical user interface. The following description is presented to enable one of ordinary skill in the art to make and use the invention and is provided in the context of a patent application and its requirements. Various modifications to the preferred embodiment and the generic principles and features described herein will be readily apparent to those skilled in the art.

Figure 1:
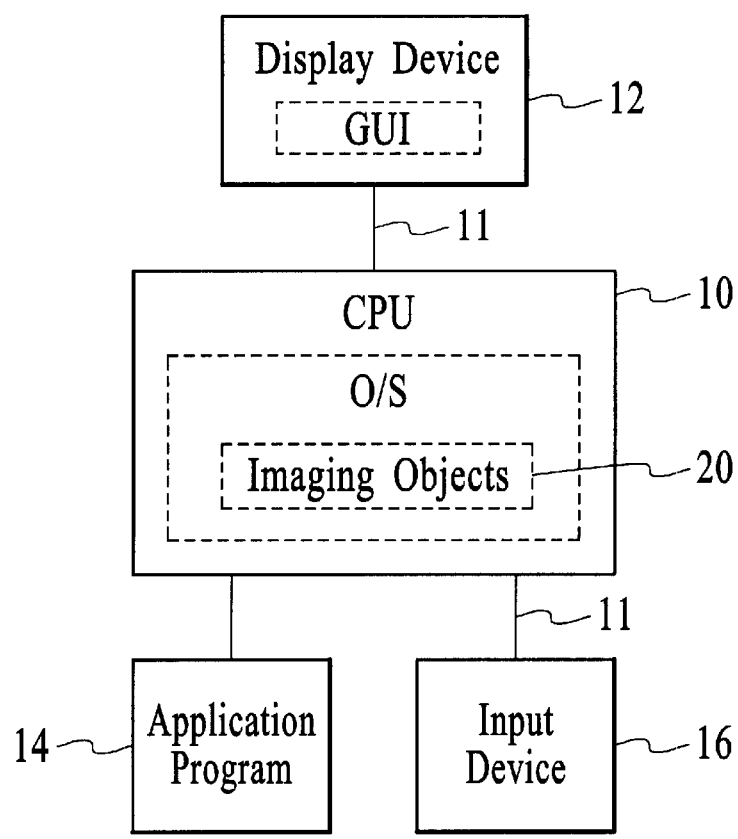
FIG. 1 illustrates a block diagram of a computer system in accordance with the present invention.

FIG. 1 illustrates a computer system environment in accordance with the present invention. Included in the system are a computer 10, the computer 10 including a central processing unit and an operating system, a display device 12, the display device 12 displaying graphical user interfaces (GUI) and coupled to an input/output (I/O) bus 11, an application program 14, the application program 14 running on the computer 10, and user input devices 16, such as a mouse, keyboard or other input device, coupled to I/O bus 11.

In accordance with the present invention, the operating system for computer 10 includes an imaging object structure 20, which is an object oriented class hierarchy of imaging objects. An expanded representation of the imaging object structure 20 is presented in FIG. 2. Imaging object structure 20 preferably refers to an abstract base class that defines some pure virtual functions that are overridden by specialized subclasses. The imaging object structure 20 is preferably a shared library within the computer 10 that is implemented in a preferred embodiment using SOM (system object model), which is available from IBM Corporation, New York. Of course, the imaging object structure may be implemented using a programming language, such as C or C++ without using SOM.

The imaging object structure 20 preferably provides developers with imaging objects for use in a GUI, including GUI elements, such as menus, buttons, and lists. As used herein, the imaging object structure 20 suitably defines methods and static functions inherited by each of the subclasses of imaging objects and may define other specialized methods that are relevant to the subclasses, namely text imaging objects 28, composite imaging objects 29, picture imaging objects 30, pattern imaging objects 32, and icon imaging objects 34. Examples of the methods performing operations common to all of the imaging objects include, but are not limited to, creating, initializing, measuring, and drawing an image reference.

A composite imaging object 29 preferably refers to a subclass of imaging objects that is capable of managing an aggregate of singular images or composite images as a single composite image, where singular images preferably refer to those images that are formed from one imaging object type, including, but not limited to, text images, pattern images, picture images, or icon images. Since the raw data format for the underlying images are necessarily different for the different image types, e.g., text format is different from picture format, raw data cannot be used polymorphically. In addition, difficulty typically exists in cloning the raw image data for effective data sharing. However, the present invention solves these problems, among other things, by putting a 'wrapper' around the raw image data called an image reference and using that image reference to refer to the image data indirectly.

Figure 2:
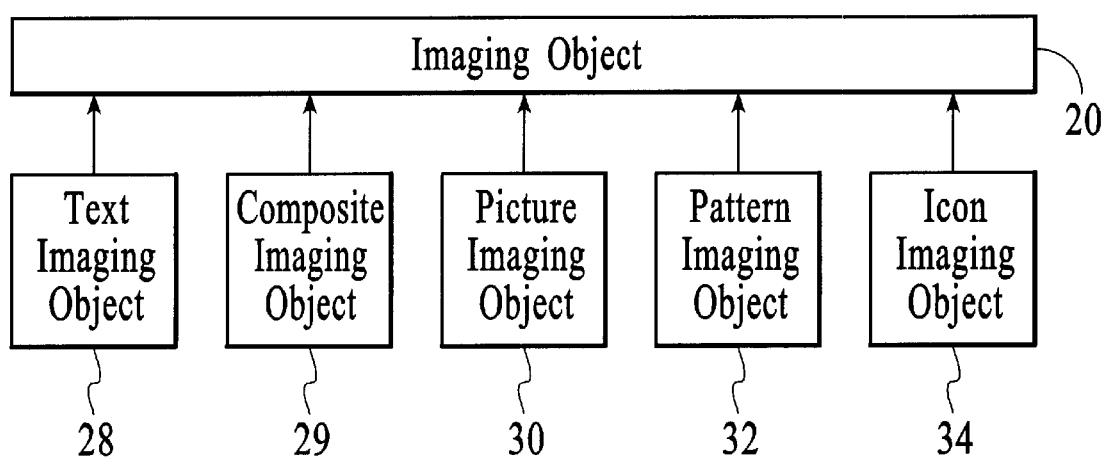
FIG. 2 illustrates an imaging object structure in accordance with the present invention.

Imaging objects suitably take advantage of the indirection by storing both common and type specific information in the image reference. Additionally, the image data for singular and composite images are suitably substantially similar in form, so that they may be used polymorphically. It should be further appreciated that the object oriented hierarchy as presented in FIG. 2 is expandable, such that other subclasses of imaging objects, for example three-dimensional imaging objects, may be included as desired. Further, the imaging objects 28–34 suitably are rendering engines that preferably measure and render images with image data, each type of image data having an associated imaging object.

The operating system preferably maintains a registry of the types of imaging objects. Given an imaging object type, a static function in the imaging object base class suitably finds and instantiates, if necessary, a particular imaging object and returns a reference to it. Thus, the imaging object structure 20 allows external software developers to define custom imaging objects to use in place of or in addition to the system defined imaging objects.

Figure 3:
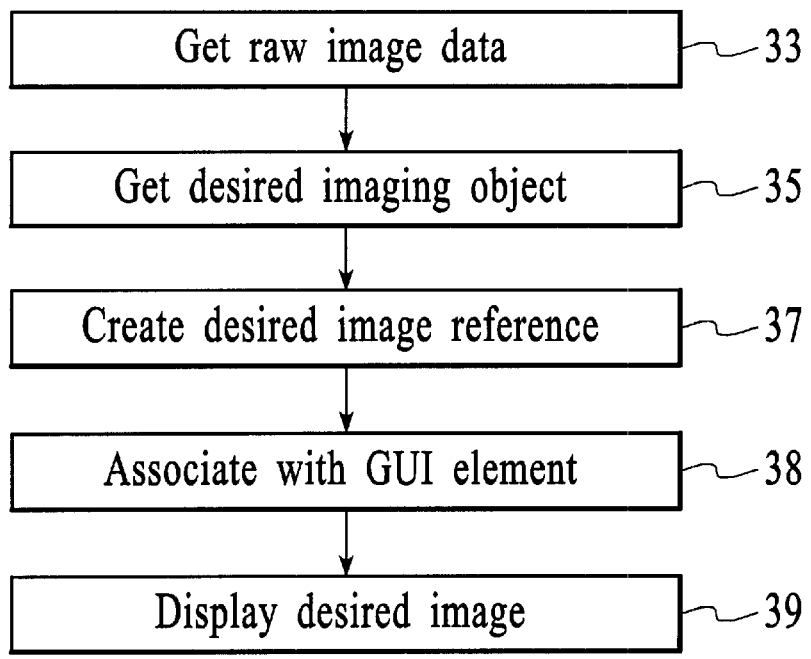
FIG. 3 illustrates an overall flow diagram of interface element formation in accordance with the present invention.

In developing images in a GUI, such as in menu, button, and list elements for the GUI, the application program 14 suitably performs standard system calls to the imaging object structure 20 for one or more of the imaging objects 28–34. Preferably, with the use of the imaging object structure 20 in accordance with the present invention, the application program 14 is unaware of the specifics of the image data formation by the imaging object structure 20 and the subclasses of imaging objects 28–34. FIG. 3 illustrates a flow diagram for development of interface images using various imaging object types through utilization of the imaging object structure 20 and subclasses of imaging objects 28–34 in accordance with the present invention.

A system call by an application program 14 for raw image data, e.g., a 'print' textstring for a GUI element, initiates the process (step 33). A call is then made for a desired imaging object, e.g., text imaging object 28. The imaging object structure 20 in conjunction with the subclasses of imaging objects 28–34 create the desired image reference (step 37), the details of which are presented with reference to FIGS. 4a and 4b. Once the desired image reference is created, the image is associated with a particular desired GUI element (step 38).

The image is then displayed (step 39) utilizing separate system calls by the application program 14 to the imaging object structure 20. By way of example, a button element makes a call to the imaging object structure 20 to determine the image type of the image reference, e.g., text. A further call to the imaging object structure 20 suitably determines the subclass of imaging object structure, e.g., text imaging object 28, capable of handling the request. A draw request from the element suitably results in the subclass of the imaging object structure 20, e.g., text imaging object 28, rendering the image reference data in the interface element.

Figure 4A:
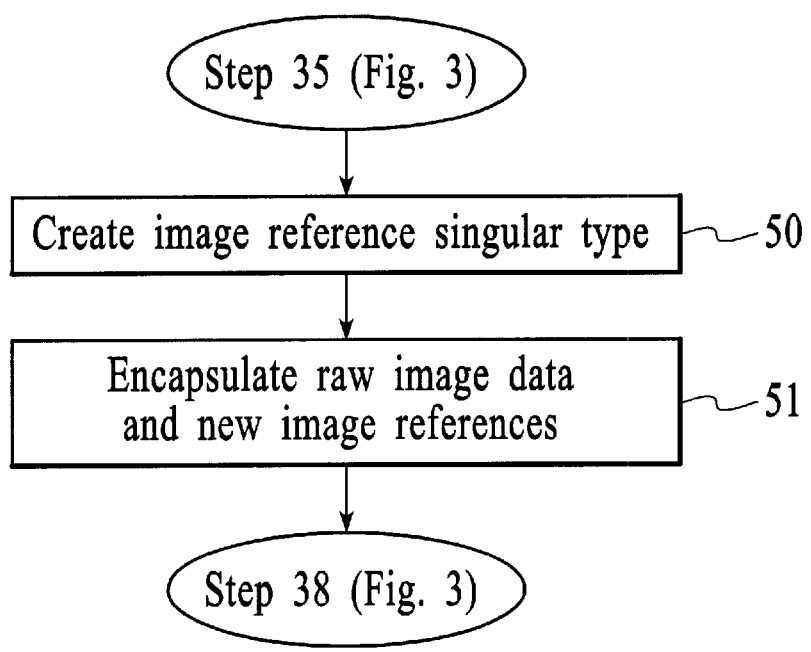
FIGS. 4a and 4b illustrate flow diagrams of image object development utilizing the imaging object structure in accordance with the present invention.
Figure 4B:
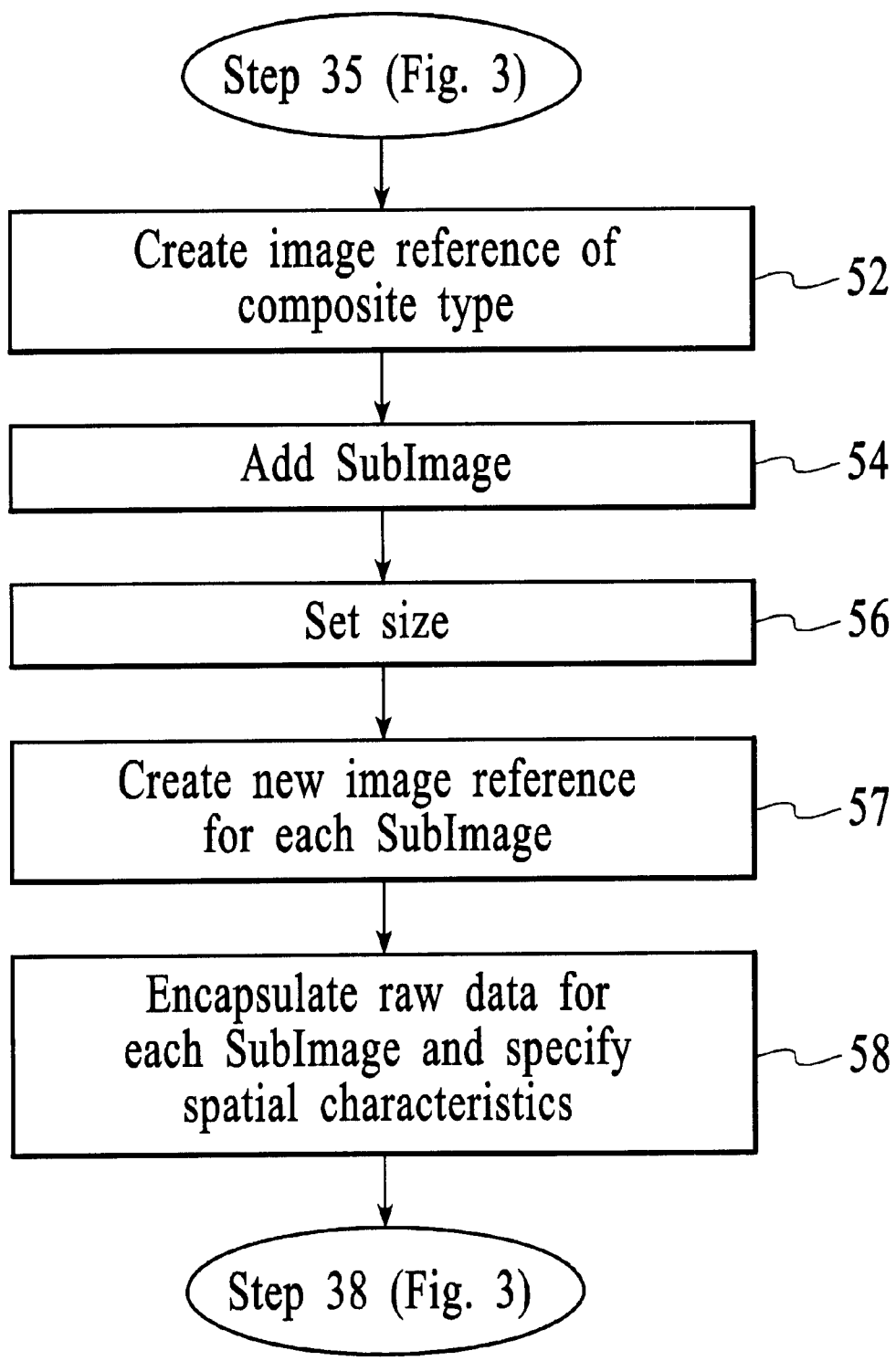

For step 39 of FIG. 3, creation of a singular image reference differs from creation of composite image reference. FIG. 4a presents a flow diagram of the creation of singular image reference, while FIG. 4b presents a flow diagram of the creation of composite image reference. Preferably, the system call suitably indicates to the imaging object structure 20 which type of image reference is needed.

Referring to FIG. 4a, when the desired image reference is a singular image reference, a new image reference for the desired imaging object data is created with the imaging object structure 20 (step 50). For example, an address within a memory component of computer 10 (FIG. 1) for the image reference is provided, e.g., NewImage(textIO, text image) to allocate memory for a text image reference 'text image' by the text imaging object 'textIO'. The attributes, including the raw data, of the image reference are then encapsulated by the appropriate subclass of imaging objects 28, 30, 32, or 34. By way of example, the text imaging object 28 performs a SetText(textIO, text image, textstring), the 'textstring' being that set of characters, such as 'print' associated with the image reference 'text image' being specified for the text imaging object 'textIO'. Suitably then, the image reference is available to be associated with the GUI (step 38, FIG. 3).

When the desired image reference data is not singular, but rather is a composite of reference data for two or more singular or composite images, e.g., an icon item with text item labelling, creation of a new image reference as a composite type preferably occurs (step 52, FIG. 4*b*). By way of example, a call is made to the imaging object structure 20 for a NewImage(compIO, compImage) to allocate memory and initialize a composite image reference 'compImage' by a composite imaging object 'compIO'.

Each of the subimages, i.e., the singular and/or composite images forming the new composite image, are added (step 54) by the composite imaging object 29. Suitably, AddSubImages (compIO, compImage, #) specifies the addition of a number "#" of subimages, each of the subimages forming the composite image reference 'compImage' being specified for the composite imaging object 'compIO'. The size of the composite image is then set (step 56) such that an outer bounds is specified for the composite image to define an area in the interface occupied by the composite image. A new image reference for each of the subimages forming the composite image are created (step 57). Thus, for each subimage that is a singular image, the creation as described with reference to FIG. 4*a* is performed,. while for each subimage that is in itself a composite image, the creation as described with reference to FIG. 4*b* is followed. Once the image reference for each subimage is created, the subimages are encapsulated in the image reference for the composite image being formed, and the spatial characteristics of each of the subimages are specified (step 58).

By way of example, SetSubImage(compIO, compImage, iconindex, iconimage, iconImageRect) suitably provides, in this example, an icon 'iconImage' as the subimage indexed by the 'iconindex' to specify which of the '#' subimages the icon represents. Further, the 'iconImageRect' suitably indicates the portion of the composite image occupied by the icon image. Correspondingly, SetSubImage(compIO, compImage, textindex, textImage, textImageRect) suitably provides the characters 'textImage' as the subimage indexed by the 'textindex' with the text portion of the composite image indicated by 'textImageRect'. Thus, the data 'compImage' forming the image reference 'compIO', such as an icon of a printer with text labelling of the printer type forming a composite image within a list element listing the printers attached to a computer system, is provided. The size relationship among the subimages suitably specifies the area occupied within the composite image by each subimage, e.g., SetImageSize(areatext), SetImageSize(areaicon). The image reference for the composite image is then available for associating with the GUI (step 38, FIG. 3).

The present invention readily provides a more versatile system for producing images in elements of a graphical user interface. More particularly, the creation of imaging reference data in accordance with the present invention produces image references that are substantially similar in nature, i.e., polymorphic, such that the GUI need not know the format of the reference data. Further, since the elements normally are only capable of utilizing single reference data, the inclusion of a composite imaging object allows convenient and straightforward utilization of multiple types of imaging data in a single reference. Further flexibility is achieved with the ability to define references to imaging object reference data that allows sharing of images among elements. Thus, the present invention effectively improves development and designation of various, custom elements in a graphical user interface.

Although the present invention has been described in accordance with the embodiments shown, one of ordinary skill in the art will recognize that there could be variations to the embodiment and those variations would be within the spirit and scope of the present invention. For example, the program instructions for utilization of the imaging object structure in accordance with the present invention may be suitably provided on a computer readable medium, including floppy disks. Accordingly, many modifications may be made by one of ordinary skill without departing from the spirit and scope of the present invention, the scope of which is defined by the following claims.

What is claimed is:

1. A system for providing polymorphic image data for elements in a graphical user interface on a computer system, the system comprising:

an operating system; and an imaging object structure comprising a subclass of imaging objects that inherit method and static functions of the imaging object structure, the subclass comprising singular imaging objects and composite imaging objects, the imaging object structure included in the operating system and utilized to generate images in any of a plurality of differing elements displayed in the graphical user interface with rendering of the images in the plurality of differing elements by the subclass of imaging objects.

2. The system of claim 1 wherein the plurality of differing elements further comprises button elements, list elements, and menu elements.

3. The system of claim 1 wherein the singular imaging objects further comprise text imaging objects.

4. The system of claim 1 wherein the singular imaging objects further comprise picture imaging objects.

5. The system of claim 1 wherein the singular imaging objects further comprise pattern imaging objects.

6. The system of claim 1 wherein the singular imaging objects further comprise icon imaging objects.

7. The system of claim 1 wherein the composite imaging objects generate composite images of a desired combination of singular images generated by the singular imaging objects.

8. The system of claim 1 wherein the imaging object structure comprises a SOM object structure.

9. A method for providing polymorphic image data for image display on a graphical user interface, including user interface elements, in a computer system, the method comprising:

retrieving image data;

retrieving a desired imaging object, the desired imaging object comprising one of a subclass of imaging objects, the subclass comprising singular imaging objects and composite imaging objects;

creating an image reference as a wrapper around the image data for the desired imaging object to allow reference to the image data indirectly;

associating the image reference with any of a plurality of elements of the graphical user interface; and displaying the desired image on the graphical user interface when the desired image is rendered in one of the plurality of differing elements by one of the subclass of imaging objects.

10. The method of claim 9 wherein creating an image reference further comprises creating an image reference of a singular type when the desired image is a singular image, and encapsulating the image data as the image reference for the desired image.

11. The method of claim 10 wherein the singular image further comprises an image of the group consisting of a text image, an icon image, a picture image, and a pattern image.

12. The method of claim 9 wherein creating an image reference further comprises creating the image reference of a composite image when the desired image is a composite image, adding subimages for the desired image, setting a size of the desired image, creating new image references for each subimage of the desired image, encapsulating the image data for each subimage in the image reference, and specifying spatial characteristics of each of the subimages.

13. The method of claim 12 wherein the subimages comprise singular images and composite images.

14. The method of claim 13 wherein the singular images further comprise images of the group consisting of a text image, an icon image, a picture image, and a pattern image.

15. A computer system for providing polymorphic image data for elements in a graphical user interface, the computer system comprising:
- a display device for displaying the graphical user interface;
- an operating system, the operating system including an imaging object structure, the imaging object structure comprising a subclass of singular imaging objects and composite imaging objects that inherit method and static functions of the imaging object structure; and
- an application program, the application program for utilizing the imaging object structure to generate images in the graphical user interface in any of a plurality of differing elements in the graphical user interface with rendering of the images in the plurality of differing elements by the subclass of singular imaging objects and composite imaging objects.

16. The computer system of claim 15 wherein the subclass of singular imaging objects further comprises text imaging objects, picture imaging objects, pattern imaging objects, and icon imaging objects.

17. The computer system of claim 15 wherein the images further comprise singular images.

18. The computer system of claim 15 wherein the images further comprise composite images.

19. The computer system of claim 15 wherein the imaging object structure comprises a SOM object structure.

20. A computer readable medium containing program instructions for providing polymorphic image data for image display on a graphical user interface, including user interface elements, in a computer system, and comprising:
- retrieving image data;
- retrieving a desired imaging object, the desired imaging object comprising one of a subclass of imaging objects, the subclass comprising singular imaging objects and composite imaging objects;
- creating an image reference a wrapper around the image data for the desired imaging object to allow reference to the image data indirectly;
- associating the image reference with any of a plurality of elements of the graphical user interface; and
- displaying the desired image on the graphical user interface when the desired image is rendered in one of the plurality of differing elements by one of the subclass of imaging objects.

* * * * *